2,736,716

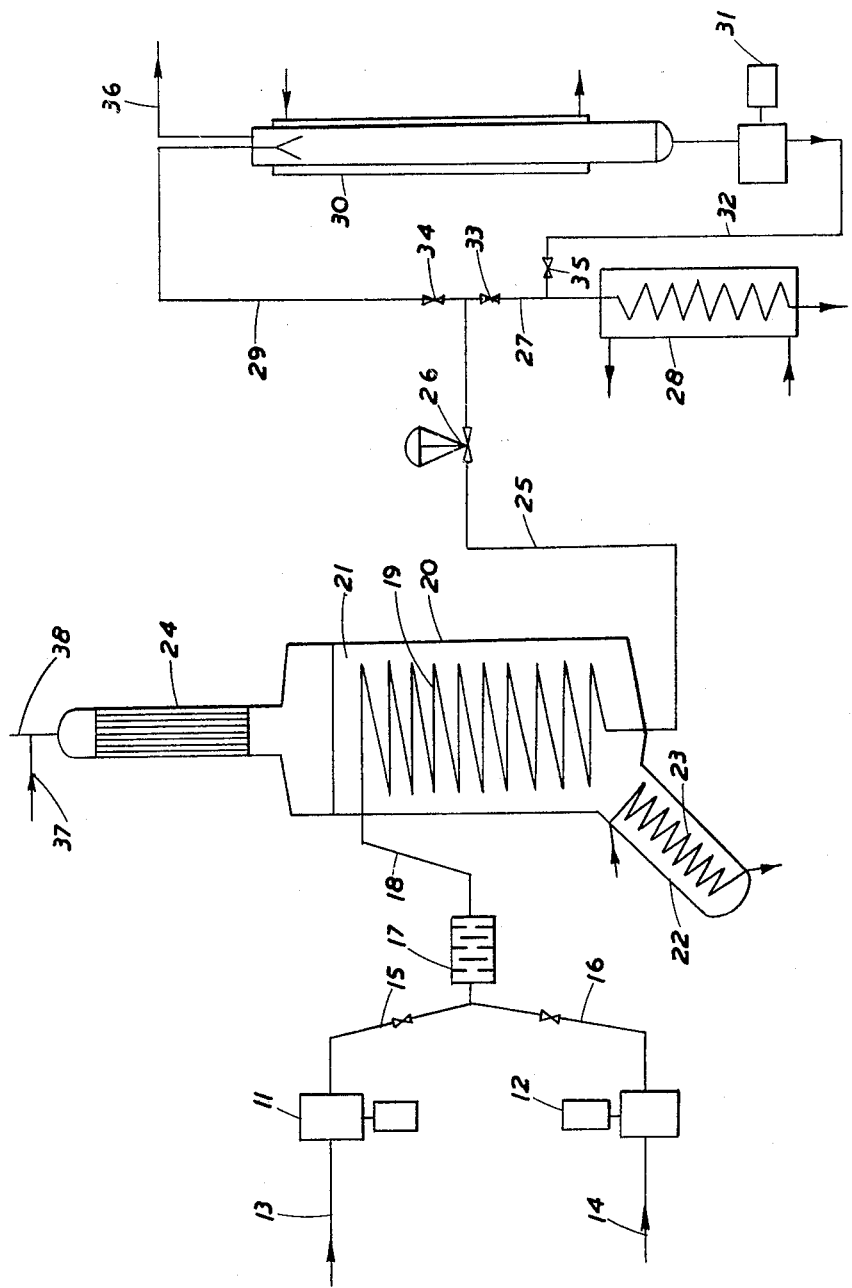
Inventors
ARNOLD JOHN LOWE AND DONALD BUTLER
By
C. B. Quaintance
Attorney United States Patent Office 2,736,716
Patented Feb. 28, 1956

PRODUCTION OF POLYMERIC PRODUCTS FROM STYRENE AND UNSATURATED FATTY COMPOUNDS

Arnold John Lowe, Manchester, and Donald Butler, Moston, Manchester, England, assignors to Oxirane Limited, London, England Application January 31, 1952, Serial No. 269,222

Claims priority, application Great Britain February 7, 1951

20 Claims. (Cl. 260—23)

This invention relates to the production of polymeric products from styrene and drying oil unsaturated fatty acids or partial or full esters of polyhydric alcohols and the acids.

It is known to produce such polymeric products by heating styrene with the mixed fatty acids derived from drying oils, with the esters in the form of the drying oils or with the partial esters obtained by reacting the drying oils with a polyhydric alcohol or the drying oil fatty acids with an excess of a polyhydric alcohol.

The polymeric products formed with drying oils have valuable film-forming properties and are commonly called styrenated drying oils. They are used in coating compositions, impregnating compositions and the like.

The polymeric products formed with the drying oil fatty acids or partial esters of polyhydric alcohols with these acids are usually converted to the so-called styrenated alkyd resins which are also used in coating compositions. Further the polymeric products formed with the fatty acids may be esterified with polyhydric alcohols to yield styrenated esters having similar properties to the styrenated drying oils.

Batch processes for the production of the polymeric products referred to above have been described in which the mixture of reactants is heated in a reactor under atmospheric pressure and under refluxing conditions for many hours, usually in the presence of a catalyst.

Furthermore in United Kingdom patent specification No. 622,948, a process for the production of polymeric products from styrene and partially polymerised drying oils is referred to, according to which the polymerisation is effected by heating the reaction mixture to a temperature up to 250° C. under superatmospheric pressure. The preferred range of superatmospheric pressure is given as 20 to 80 lbs. per sq. inch gauge pressure and it is stated that the reaction temperatures when operating at these pressures will range from about 155° C. to the upper limit of 250° C. Though the process described in the last mentioned patent specification is stated to result in a reduction in the reaction time when compared with the processes carried out under atmospheric pressure, the reaction time is still a matter of several hours.

It has now been found that valuable polymeric products of the kind referred to above can be produced by a continuous process carried out at a high temperature and under a pressure which maintains the reaction mixture in the liquid state, with a considerably reduced reaction time.

According to the present invention a process for the production of a polymeric product from styrene and one or more unsaturated fatty compounds selected from the group consisting of drying oil unsaturated fatty acids and partial or full esters of polyhydric alcohols and said acids, comprises continuously passing a mixture of styrene and said one or more unsaturated fatty compounds through a reaction zone maintained at a temperature of from 210 to 270° C. under a pressure at least sufficient to maintain the reaction mixture in the liquid state, the contact time within the reaction zone being such that from 30 to 90% by weight of the styrene is reacted.

The process of the invention is preferably carried out with mixtures containing from 40 to 60% by weight of styrene and the contact time is preferably such that 50 to 85%, and still more preferably about 70%, of the styrene is reacted.

The contact time is largely dependent on the temperature of the reaction zone and will decrease as the temperature is increased. Thus it has been found that for temperatures of from 250 to 270° C., it is undesirable for the contact time to exceed 45 minutes. For temperatures below 250° C. the contact time need not exceed 120 minutes and may be considerably less than this. Generally speaking a contact time of 30 minutes is a preferred maximum for temperatures of from 230 to 270° C. and a contact time of 60 minutes is a preferred maximum for temperatures of from 210 to 230° C.

In a preferred form of the process of the invention a reaction mixture containing from 40 to 60% by weight of styrene is used with a reaction zone temperature of from 250 to 270° C. and a contact time of about 10 to 20 minutes.

The pressure applied to the reaction mixture to maintain it in the liquid phase may be considerably in excess of that necessary. Thus pressures of from 25 to 100 atmospheres, which have been found to yield satisfactory results, may conveniently be used.

Unreacted styrene is removed by distillation and may be recycled. It is preferably removed in a continuous stripping still operating under vacuum.

The drying oil unsaturated fatty acid esters which may be used in the process of the invention are preferably in the form of drying oils which may be selected from the following:

(a) Conjugated drying oils. This class includes naturally occurring drying oils with conjugated double bonds such as oiticica oil, China-wood or tung oil.

This class also includes the synthetically produced conjugated drying oils such as dehydrated castor oil, or isomerized drying oils produced from class (b) or (c) below.

(b) Naturally occurring unconjugated drying oils containing on average 1.5 to 3 double bonds per fatty acid chain, e. g. linseed oil, perilla oil.

(c) The unconjugated drying oils formed by esterification with a polyhydric alcohol, e. g. glycerol, pentaerythritol and sorbitol, of the mixed unconjugated fatty acids obtained by the fractional distillation of the split acids from whale oil, sardine oil, herring oil, menhaden oil, and, in particular, the fraction containing the fatty acids of chain length of $C_{20}$-$C_{22}$ and having an iodine value of 170, i. e. containing an average of 1.5 to 2.5 double bonds per fatty acid chain.

(d) The less rapid, or so-called, semi-drying oils, e. g. soya bean oil and sunflower oil.

The unsaturated fatty acids used in the process of the invention are preferably the mixed fatty acids derived from the drying oils referred to above or from which the oils are formed.

The partial esters used in the process of the invention may be formed by reacting a drying oil with a polyhydric alcohol or by reacting the unsaturated fatty acids with polyhydric alcohol in equimolar proportions. Examples are the so-called mono-glycerides.

Esters formed from the mixed fatty acids derived from the drying oils referred to under (a), (b), and (d) above and polyhydric alcohols other than glycerol, e. g. pentaerythritol, mannitol and sorbitol may also be used in the process of the invention.

When using the semi-drying oils or the mixed acids thereof it is necessary to include a proportion of conjugated drying oil or oils in the reaction mixture in order to obtain satisfactory film forming styrenated oils or styrenated acids which can be converted to alkyd resins having satisfactory film forming properties. The amount of conjugated oil present may constitute up to 50% of the fatty compound content of the reaction mixture.

The preferred fatty starting materials for the process of the invention are either mixtures of conjugated and unconjugated drying oils for the production of so-called styrenated drying oils or mixtures of conjugated drying oils and mixed fatty acids of unconjugated drying oils for the production of so-called styrenated fatty acids. In both cases the conjugated oil content of the mixtures is not more than 50% by weight.

The unconjugated oils used in the process of the invention are preferably raw oils, but the conjugated oils may be raw or partially polymerised oils. Thus oiticica oil or tung oil polymerised up to a viscosity of 50 poises at 25° C. may be used dehydrated castor oil or conjugated oils produced by isomerisation give most satisfactory results with viscosities not exceeding 5 poises at 25° C.

The process of the invention may be carried out in the presence of a solvent such as xylene or white spirits which is substantially unreactive to styrene and the fatty compounds. In such cases slightly longer contact times are required to achieve the same degree of polymerisation as when no solvent is used.

The presence of up to 0.5% by weight of sulphur, based on the total fatty compounds present, in the reaction mixture helps to improve the clarity of the films formed from the solutions of the resulting styrenated oils or of alkyd resins produced from the resulting styrenated acids whichever is the product.

Styrenated fatty acids may be produced by the process of the invention which are eminently suited for conversion into styrenated alkyd resins by reacting the styrenated fatty acids with a polyhydric alcohol e. g. glycerol and a polybasic acid or anhydride, e. g. phthalic or maleic acid or anhydride in known manner. The styrenated fatty acids may also be converted into esters by reaction with a polyhydric alcohol.

An important feature of the process of the invention is its flexibility. By varying the temperatures and contact times at which the reaction is carried out, variations of the viscosity, drying time, white spirits, tolerance, and clarity of the final, film-forming resin may be obtained.

These variations are illustrated in the following paragraphs.

The viscosity of a resin of given oil length and oil composition and the viscosities of the solutions of that resin in various solvents is proportional to the temperature at which the resin was produced. Styrenated oils containing 40% linseed oil, 20% oiticica oil, 40% styrene in the resultant resin were prepared at 260°, 240°, and 220° C. They were dissolved in an equal mixture of xylene and white spirits to give a solution containing 80% solids. The viscosities of the resulting solutions expressed in poises at 25° C. were 3, 10 and 20 respectively.

This variation of viscosity with temperature of production gives us an easy means of controlling the solids in the resin solution when made up as a varnish solution. This variation is not easy by conventional processes.

The drying times of comparable styrenated oils produced at different temperatures are dependent on the temperature of production of the resin and if produced at temperatures of over 250° C. also dependent on the time of reaction. A styrenated oil embodying the following raw materials linseed oil 42%, China-wood oil 18%, styrene 40% was produced at a 30 minute contact time at 215° C., a 30 minute contact time at 233° C., a 10 minute contact time at 260° C. and a 30 minute contact time at 260° C. The drying times were 3½ hours, 6½ hours, 9 hours and 18 hours respectively. Again it is seen that we have at our disposal an easy method of control of an important variable that is not so easily controlled by other processes.

When operating at high temperatures between 250 and 270° C. it is important to control the contact time to avoid the production of resins which are non-drying or have an excessive drying time. Thus as previously stated it is preferred to operate at these temperatures with contact times of about 10 to 20 minutes.

Styrenated derivatives are readily soluble in aromatic solvents such as xylene but are comparatively insoluble in aliphatic solvents such as white spirits. The latter are less costly to buy and are conventionally used to dilute resin solutions to the application viscosity. It is customary to measure the "white spirits tolerance" expressed as the grams of white spirits that will dissolve in one gram of resin at 25° C. This tolerance is not easily controlled by conventional processes and is usually about one. We measured the white spirit tolerance of the resins described in the above paragraph and found them to be 0.0, 2.1, 3.6, and 10.0 respectively. Thus it is seen that white spirit tolerance increases with temperature of production and with contact time particularly at temperatures above 250° C. and by our process, a high white spirit tolerance may be achieved.

The clarity of the film formed from the resin increases with the contact time employed for the styrenation of the product at one temperature. Thus with a styrenated product of oil length 60 and formed from fatty compounds consisting of 2 parts of linseed oil to 1 part of oiticica oil, at a temperature of 215° C. and with a contact time of 8.8 minutes, the air-dried film was opaque and waxy.

By increasing the contact time to 30 minutes, the air-dried film obtained was hard and horny and faintly opalescent. By further increasing the contact time to 73.5 minutes the air-dried film obtained was clear and tough.

The process of the invention is an exothermic one and at the high temperature employed the reaction proceeds rapidly with a rapid evolution of heat. The temperature thus tends to rise rapidly. Therefore, it is essential that the reactor comprising the reaction zone should be designed so as to ensure good conditions of heat transfer to remove the heat of reaction and to secure accurate control of the temperature of the reactants.

Thus, it is preferred to carry out the process in a tubular reactor in which the ratio of surface area to volume is large. Satisfactory removal of the heat may be obtained by surrounding the reaction coil with a boiling liquid which serves first as a means to bring the reactants to the reaction temperature and then as a means of cooling the reaction mixture, the vapours from the boiling liquid being condensed and returned to the boiling liquid.

The control of the temperature within the reactor depends on the balancing of the following two factors:

(i) The rate of heat generation which is governed by the rate of reaction of the styrene, and (ii) The rate of heat removal which is governed by the surface area of the reactor, by the overall heat transfer coefficient and the temperature difference between the reactants within the reactor and the boiling liquid surrounding the reactor.

The rate of heat generation depends on the reaction temperature and the concentration of styrene in the reaction mixture. Under the most rapid reaction conditions that are likely to be met with in practice i. e. at 260° C., 50% of the styrene reacts in about 5 minutes. At lower temperatures in the region of 215° C., the time for reaction of 50% of the styrene is about 25 minutes.

As the polymerisation of 1 lb. of styrene generates 302 B. t. u., the rate of heat generation during this first rapid reaction period can be calculated.

It has generally been found preferable to operate the process under conditions of non-turbulent flow through the reactor. Under these conditions the overall heat transfer coefficient may be given values of between 20 and 100 B. t. u./sq. ft./hour/° F. Using these values it is possible to calculate the surface area of the reactor required to limit the temperature difference between the reactants in the reactor and the surrounding boiling bath approximately to the desired figure which should not exceed 10° C. and preferably does not exceed 5° C.

With the reactor used in the examples described below, it was found that the temperature differences were in close agreement with those predicted.

The manner in which the process of the invention may be carried out will be described below with reference to the accompanying drawing which illustrates diagrammatically a suitable apparatus for the carrying out of the invention.

Referring to the drawing, the styrene and the unsaturated fatty material are separately and continuously pumped under pressure from supply lines 13 and 14 respectively into an orifice mixer 17 in which they are intimately mixed and the resulting mixture passes continuously into and through a reactor coil 19 mounted in a vessel 20 and surrounded by boiling liquid 21. The liquid 21 is caused to boil vigorously by a heating fluid passing through a coil 23 in reboiler 22. Vessel 20 is fitted with a reflux condenser 24 in which the vapours from the boiling liquid 21 are condensed, the condensate flowing back into the vessel 20. An inert gas such as nitrogen may be fed through pipe 37 and vent pipe 38 of the condenser 34 in order to maintain a non-oxidising atmosphere above the boiling liquid 21 which may be a hydrocarbon blend e. g. a mixture of alkyl naphthalenes and toluene.

The products leaving the reactor coil 19 are passed through pipe 25 and a needle let-down valve 26, which is adjusted to maintain the desired pressure within the reactor coil 19, and they may then be passed either via pipe 27 into cooler 28 and thence to storage, the unreacted styrene being removed as and when desirable, or, alternatively, and preferably, the products may be passed through pipe 29 to a continuous stripping still 30 which is operated under vacuum. In the latter case the unreacted styrene (and solvent, if used) is distilled off in the still 30 and is led off by pipe 36 to a condenser (not shown) and the styrenated product collects in the bottom of the still 30 and is pumped by pump 31 through pipe 32 and cooler 28 to storage or for further treatment. Valves 33, 34, and 35 are provided to control the path of the products passing out through needle valve 26. With valves 34 and 35 open and valve 33 shut, the products pass to the stripping still 30. With valve 33 open and valves 34 and 35 shut, the products pass direct to the cooler 28. The recovered, unreacted styrene is recycled.

The procedure and apparatus described above was used in each of the following examples of processes carried out in accordance with the invention.

The reactor coil 19 used in these examples consisted of a stainless steel tube of ¼ inch external diameter, of 0.154 inch internal diameter, and of 75 feet in length when extended.

The oiticica oil used in the examples consisted of the oil sold under the trade name "Cicoil" with a viscosity of from 5 to 30 poises at 25° C.

All parts and percentages referred to in the examples are by weight.

*Example 1*

A mixture of 50% of styrene and 50% of linseed oil was fed to the reactor. The temperature of the boiling liquid in the bath was 260° C. and the temperature inside the reactor was between 265–270° C. The pressure in the reactor was 60 to 70 atmospheres and the contact time was 15 minutes.

In all 1,375 gms. were fed to the reactor and 1,370 gms. of material recovered.

The percentage of styrene reacted was found to be 85% and the excess was removed by distillation under 20 mms. Hg absolute pressure at a temperature of about 150 to 160° C.

The product was soluble in white spirits and was diluted with this solvent to give a solution having a viscosity of 2.5 poises at 25° C. A solution of metal naphthenate driers, containing 5% lead metal, 0.25% cobalt metal and 0.25% manganese metal, was then added to yield a solution having a viscosity of 2.2 poises at 25° C. and containing 0.02% cobalt metal, expressed on the solid weight of the resin.

A film of this solution spread on to glass air-dried in four hours to give a hard, slightly opalescent coating which adhered well to the glass.

*Example 2*

Styrenated linseed oil was prepared as in Example 1 from a linseed oil in which 0.15% of sulphur had been dissolved before passing it through the reactor. Part of the product was diluted with white spirits and treated with a metal naphthenate drier as in Example 1 to yield a solution having a viscosity of 2.2 poises at 25° C. and a cobalt metal content of 0.02% expressed on the solid weight of the resin. A film drawn out to 3/1000 inch thick air-dried in five hours to a clear hard coating.

A further part of the product (50 parts) was ground for 48 hours with 50 parts of white spirits and 50 parts of Rutile oxide (titanium dioxide) and mixed metal naphthenate driers of the composition given in Example 1 to yield a paste containing 0.02% of cobalt metal. The paste was mixed with an equal quantity by weight of a solution of product in white spirits having a viscosity of 2.2 poises at 25° C. and containing the same percentage of mixed driers and this mixture was further diluted with white spirits to a viscosity of 2.2 poises at 25° C. The white paint so produced dried to a hard film when applied to a metal panel and exposed to air for five hours.

*Example 3*

The reaction mixture fed to the reactor in this example consisted of:

| | Per cent |
|---|---|
| Linseed oil | 33.3 |
| Oiticica oil | 16.7 |
| Styrene | 50 |

The temperature of the boiling liquid in the bath was 252° C. and that in the reactor was about 260° C. The pressure on the system was 80 to 100 atmospheres and the contact time was 10 minutes.

670 gms. of reactants were fed to the reactor and 668 gms. of product recovered.

283 gms. of the product were stirred at 140–170° C. under 15 mms. Hg absolute pressure for 45 minutes to distil off excess styrene. The liquid residue solidified on cooling to 20° C. to yield 245 gms. of a clear pale greenish resin.

A sample of this resin was diluted to a viscosity of 2.2 poises at 25° C. with white spirits (70% resin, 30% white spirits) and treated with mixed metal naphthenate driers of the composition referred to in Example 1 to give a concentration of 0.02% of cobalt metal expressed on the weight of the solid resin. A 3/1000 inch thick film of this mixture on exposure to air dried to a hard clear film in 3¾ hours.

A further sample of the resin solution formed according to the preceding paragraph was ground with half its weight of titanium oxide and with the mixed metal naphthenate driers referred to in Example 1 and then thinned with white spirits. The resulting white paint dried to a hard, glossy film on application to a metal panel and exposure to the air.

Example 4

The reaction mixture fed to the reactor consisted of:

| | Per cent |
|---|---|
| Linseed oil | 11.25 |
| Tung oil | 3.75 |
| Dehydrated castor oil (having a viscosity of 3 poises at 25° C.) | 22.5 |
| Styrene | 25 |
| White spirit | 37.5 |

The temperature of the boiling bath was 260° C. and that in the reactor between 265 and 270° C. The pressure applied was 70 to 90 atmospheres and the contact time was 15 minutes.

The product was a pale yellow liquid with a viscosity of less than 0.5 poise at 25° C. The solid content of the product was 54.5%.

Solvent and unreacted styrene were removed under a pressure of 15 mms. Hg absolute pressure at 100° C. until a product with a viscosity of 2.5 poises at 25° C. was obtained (solid content 70%). On treating with mixed metal naphthenate driers as in Example 1 and casting in the form of a film, a hard, clear solid resin was obtained after exposure to air for three hours.

Example 5

A mixture of:

| | Parts |
|---|---|
| Linseed oil | 38.5 |
| Tung oil | 16.5 |
| Styrene | 45 | was fed to the reactor. The temperature of the boiling liquid in the bath was 250° C. and that in the reactor was about 255–260° C. The pressure in the reactor was 26–34 atmospheres and the contact time was 30 minutes.

The product from the reactor was freed from unreacted styrene, which amounted to 7.7 parts, by heating to 200° C. under 10 mms. Hg absolute pressure. The residue was cooled and there resulted 92.3 parts of a styrenated oil or resin having a white spirit tolerance of 10 (g./g. at 25° C.).

This resin was diluted to a viscosity of 3 poises at 25° C. with xylene (80% resin, 20% xylene). To this solution was added a solution of mixed metal naphthenate driers so that for every 100 parts of resin 0.5 part of lead, 0.025 part of manganese and 0.025 part of cobalt were present. The solution containing the driers was further diluted with xylene until its viscosity corresponded to 90 seconds flow at 25° C. in a Ford No. 4 cup viscometer. The concentration of resin in this final solution was 75.4%.

This solution was left to stand for 12 hours and a 0.0015 inch thick film of this solution was then spread on a glass panel and exposed to air; it dried to a clear film after 18 hours. On standing for several days a clear, glossy, tough film resulted which adhered well to the glass.

Example 6

A mixture of:

| | Parts |
|---|---|
| Linseed oil | 33.3 |
| Oiticica oil | 16.7 |
| Styrene | 50 | was fed to the reactor. The temperature of the boiling liquid in the bath was 233° C. and that in the reactor was about 235–238° C. The pressure in the reactor was 26–34 atmospheres and the contact time was 10.6 minutes.

The product from the reactor was freed from unreacted styrene, which mounted to 23.4 parts, by heating to 200° C. under 10 mms. Hg absolute pressure. The residue was cooled and there resulted 76.6 parts of a resin.

This resin was diluted to a viscosity of 10 poises at 25° C. with a mixture of xylene and white spirits (80% resin, 10% xylene, 10% white spirits). To this solution there was added a solution of mixed metal naphthenate driers to give a concentration of metal similar to that in Example 5. The solution containing the driers was further diluted with white spirits until its viscosity corresponded to 90 seconds flow at 25° C. in a Ford No. 4 cup viscometer. The concentration of resin in this final solution was 68.0%.

This solution was left to stand for 12 hours and a 0.0015 inches thick film of this solution was then spread on a glass panel where it air-dried to a clear film after 8 hours. On standing for several days a clear, hard, tough film resulted which adhered well to the glass.

Example 7

A mixture of:

| | Parts |
|---|---|
| Lindseed oil | 30 |
| Oiticica oil | 15 |
| Styrene | 55 | was fed to the reactor. The temperature of the boiling liquid in the bath was 214° C. and that in the reactor was about 216–219° C. The pressure in the reactor was 26–34 atmospheres and the contact time was 30 minutes.

The product from the reactor was freed from unreacted styrene, which amounted to 21.7 parts, by heating to 200° C. under 10 mms.Hg absolute pressure. The residue was cooled and there resulted 78.3 parts of a resin.

This resin was diluted to a viscosity of 20 poises at 25° C. with a mixture of white spirits and xylene (80% resin, 10% xylene, 10% white spirits). To this solution there was added a solution of mixed metal naphthenate driers to give a concentration of metal similar to that in Example 5. The solution containing the driers was further diluted with white spirits until its viscosity corresponded to 90 seconds flow at 25° C. in a Ford No. 4 cup viscometer. The concentration of resin in this final solution was 62.5%.

This solution was left to stand for 12 hours and a 0.0015 inch thick film of this solution was then spread on a glass panel where it dried to a clear film after 3 hours exposure to air. On standing for several days a clear, tough film resulted which adhered well to the glass.

Example 8

A mixture of:

| | Parts |
|---|---|
| Lindseed oil | 31.5 |
| Tung oil | 13.5 |
| Styrene | 55 | was fed to the reactor. The temperature of the boiling liquid in the bath was 212° C. and that in the reactor was about 214–218° C. The pressure in the reactor was 26–34 atmospheres and the contact time was 30 minutes.

The product from the reactor was free from unreacted styrene, which amounted to 27.1 parts, by heating to 200° C. under 10 mms. Hg absolute pressure. The residue was cooled and there resulted 72.9 parts of a resin.

This resin was diluted to a viscosity of 7 poises at 25° C. with xylene (80% resin, 20% xylene). To this solution there was added a solution of mixed metal naphthenate driers to give a concentration of metal similar to that in Example 5. The solution containing the driers was further diluted with xylene until its viscosity corresponded to 90 seconds flow at 25° C. in a Ford No. 4 cup viscometer. The concentration of resin in this final solution was 67.3%.

This solution was left to stand for 12 hours and a 0.0015 inch thick film of this solution was then spread on a glass panel where it dried to a clear film after 3.5 hours exposure to air. On standing for several days a clear, tough film resulted which adhered well to the glass.

Example 9

A mixture of:

| | Parts |
|---|---|
| Linseed oil | 26.7 |
| Oiticica oil | 13.3 |
| Styrene | 60 | was fed to the reactor. The temperature of the boiling liquid in the bath was 250° C. and that in the reactor was about 255–260° C. The pressure in the reactor was 26–34 atmospheres and the contact times was 10 minutes.

The product from the reactor was freed from unreacted styrene, which amounted to 14.5 parts, by heating to 200° C. under 10 mms.Hg absolute pressure. The residue was cooled and there resulted 85.5 parts of a resin.

This resin was diluted to a viscosity of 20 poises at 25° C. with xylene (80% resin, 20% xylene). To this solution there was added a solution of mixed metal naphthenate driers to give a concentration of metals similar to that in Example 5. The solution containing the driers was further diluted with xylene until its viscosity corresponded to 90 seconds flow at 25° C. in a Ford No. 4 cup viscometer. The concentration of resin in this final solution was 65.0%.

This solution was left to stand for 12 hours and a 0.0015 inch thick film of this solution was then spread on a glass panel where it dried to an opalescent film after 3 hours exposure to air. On standing for several days a tough, opalescent film was obtained.

Example 10

A mixture of:

| | Parts |
|---|---|
| Linseed oil | 40 |
| Oiticica oil | 20 |
| Styrene | 40 | was fed to the reactor. The temperature of the boiling liquid in the bath was 217° C. and that in the reactor was about 220–224° C. The pressure in the reactor was 26–34 atmospheres and the contact time was 60 minutes.

The product from the reactor was freed from unreacted styrene, which amounted to 10.8 parts, by heating to 200° C. under 10 mms.Hg absolute pressure. The residue was cooled and there resulted 89.2 parts of a resin.

This resin was diluted with xylene (80% resin, 20% xylene) and a solution of mixed metal naphthenate driers was added to give a concentration of metal similar to that in Example 5. The solution containing the driers was further diluted with xylene until its viscosity corresponded to 90 seconds flow at 25° C. in a Ford No. 4 cup viscometer.

This solution was left to stand for 12 hours and a 0.0015 inch thick film of this solution was spread on a glass plate where it dried on exposure to air to a hard film which toughened on standing for several days.

Example 11

A mixture of:

| | Per cent |
|---|---|
| Distilled linseed oil fatty acids | 40 |
| Oiticica oil | 10 |
| Styrene | 50 | was fed to the reactor. The temperature of the boiling liquid in the bath was 257° C. and that in the reactor between 260 and 265° C. The contact time was 10 minutes and the pressure applied was 60 to 70 atmospheres. The product from the reactor was freed from unreacted styrene by vacuum distillation at 160–170° C. It was found that 70% of the styrene had reacted.

200 gms. of the styrene free product were mixed with 52 gms. of glycerol and 81 gms. of phthalic anhydride. This mixture was heated rapidly under a stream of carbon dioxide to 240° C. and held at this temperature for 4 hours. The resulting resin solidified to an opaque mass and had an acid value of 9 (expressed as mgms. of caustic potash necessary to neutralise 1 gm. of resin to a phenolphthalein end point). 60 parts of the resin were thinned with 40 parts of xylene to a viscosity of 2.7 poises at 25° C. and cobalt naphthenate driers were added to give a cobalt metal concentration of 0.03% based on the solids content of the solution. A film of this solution, 3/1000 inch thick, dried on exposure to air for 1¾ hours to give a clear film that hardened with time to a clear tough coating.

A second sample of the resin solution described in the last paragraph was flowed into a film and stoved at 120° C. for 30 minutes. The resulting film when cooled was clear and hard, showing excellent properties as a surface coating material.

A third sample of the alkyd resin was diluted with an equal weight of xylene and 100 parts of this solution were ground for 48 hours with 50 parts of titanium oxide and cobalt naphthenate driers were added to give a similar cobalt metal concentration to that referred to above in this example. The resulting mixture was then mixed with 100 parts of the 50% solution of the alkyd resin in xylene containing a similar proportion of the metal naphthenate driers and diluted with xylene to a viscosity suitable for spraying. A film of the white enamel so produced dried in air in 1¾ hours to give a hard, glossy coating. Part of the white enamel was also sprayed on to a metal panel and stoved for 30 minutes at 120° C. This resulted in a tough hard film, adhering well to the metal and showing good resistance to impact and flexion.

Example 12

A mixture consisting of 50% of linseed oil fatty acids and 50% of styrene was fed to the reactor. The temperature of the boiling liquid in the bath was 252° C. and that in the reactor was in the region of 260° C. The contact time was 10 minutes and the pressure applied to the reactor was 100 to 110 atmospheres. The amount of material fed to the reactor was 3,258 gms. and 3,253 gms. of the product resulting from the reaction, which had a solids content of 85.5%, were recovered.

After removal of the excess styrene by vacuum distillation 462 parts of the product were reacted with 135 parts of glycerol and 202 parts of phthalic anhydride as described in Example 11 but the mixture was held at 240° C. for 9 hours. The resulting resin had an acid value of 6.

After dilution and addition of driers as in Example 11, a film formed from the solution dried in air to a hard, slightly opalescent coating. A stoved film formed from this material was similar to the air-dried one but was much harder.

Example 13

The reaction mixture consisted of:

| | Per cent |
|---|---|
| Distilled linseed oil fatty acids | 40 |
| Oiticica oil | 10 |
| Styrene | 50 |

The temperature of the boiling liquid in the bath was 253° C. and that in the reactor was between 255 and 260° C. The pressure was 70 to 100 atmospheres and the reaction time was 9.7 minutes. The solid content of the product was 87.7% and the percentage of styrene reacted was found to be 75.4%.

612 gms. of the product from the reactor were heated under 15 mms. Hg absolute pressure to 160–170° C. to remove the unreacted styrene and 135 gms. of glycerol and 122 gms. of phthalic anhydride were then added to the residue and the mixture was rapidly heated under a stream of carbon dioxide to 230–240° C. and maintained at this temperature for 6 hours. The resulting resin had an acid value of 4.9 and on dilution and addition of driers as in Example 11, a film was cast from the solution; after exposure to air for 1¾ hours the film was clear and hard. A solution of 60 parts by weight of the alkyd resin in 40 parts by weight of xylene and containing driers as above, had a viscosity of 2.8 poises at 25° C. and stoved in film form to give an exceedingly hard clear enamel.

*Example 14*

The reaction mixture consisted of:

| | Per cent |
|---|---|
| Styrene | 50 |
| Fish oil unsaturated fatty acids ($C_{20}$–$C_{22}$ fraction having an iodine value of 170) | 50 |

The temperature of the boiling liquid in the bath was 252° C. and that in the reactor was about 255° C. Contact time was 10 minutes and the pressure applied was 70 to 100 atmospheres.

3,610 gms. of material were fed to the reactor and 3,605 gms. recovered. The percentage of solids in the product from the reactor was 85.5 and the percentage of styrene reacted was 71.0.

After removal of the unreacted styrene by vacuum distillation, the styrenated product was reacted with glycerol and phthalic anhydride as described in Example 11 but the mixture was held at 240° C. for 6 hours. The acid value of the alkyd resin was 7.

A 60.6% solution of the resin in xylene with driers as in Example 11 had a viscosity of 2.2 poises at 25° C. It gave, on drying in air for 1¾ hours, a clear hard film.

*Example 15*

A reaction mixture similar to the one used in Example 14 was passed through the reactor under similar conditions as in Example 14.

Without removing unreacted styrene, there were admixed 46 parts of glcerol with 972 parts of the product from the reactor and 0.9 part of concentrated sulphuric acid was added to the mixture. After stirring and heating the resulting mixture to boiling, the unreacted styrene was used to distil off the water of esterification, which had formed, azeotropically. The remaining unreacted styrene was then removed from the resin which had formed by heating to 180° C. under 10 mms. Hg absolute pressure.

The resin was diluted with xylene (70% resin, 30% xylene) and the resulting solution was stirred with lime at 50° C. After filtering this solution and cooling it, mixed metal naphthenate driers were added so that the resulting solution had a metal content of 0.5% of lead, 0.025% of manganese and 0.025% of cobalt, based on the solid content of the solution. The solution containing the driers was further diluted with xylene until it had a viscosity of 2.2 poises at 25° C. A 3/1000 inch thick film cast from this solution dried on exposure to air in 6.5 hours to a hard, slightly opalescent film; on further standing for several days a tough, slightly opalescent coating resulted.

*Example 16*

The reaction mixture consisted of:

| | Per cent |
|---|---|
| Styrene | 50 |
| Oiticica oil | 10 |
| Unsaturated fish oil fatty acids | 40 |

The temperature of the boiling liquid in the bath was 252° C. and that in the reactor between 255 and 260° C. The pressure applied was 80 to 100 atms. and the contact time was 9.5 minutes.

After removal of the excess styrene by vacuum distillation, the product was converted to an alkyd resin by reacting with glycerol and phthalic anhydride as described in Example 11, by heating the reactants at a temperature of 240° C. for 6 hours. The acid value of the resin obtained was 6.2 and the viscosity at 25° C. of a 55.5% solution of the resin in xylene was 2.8 poises. This solution containing driers as in Example 11 gave a clear dry film in less than 2 hours. A film of the solution stoved at 120° C. for 30 minutes gave a clear, hard, tough coating.

*Example 17*

The reaction mixture consisted of:

| | Per cent |
|---|---|
| Distilled sunflower oil fatty acids | 37.5 |
| Tung oil | 12.5 |
| Styrene | 50 |

The temperature of the boiling liquid in the bath was 252° C. and that in the reactor between 255 and 260° C. The pressure applied was 90 to 110 atms. and the contact time was 10 minutes.

The product was freed from unreacted styrene by vacuum distillation and was converted to an akyl resin by reacting with glycerol and phthalic anhydride as described in Example 11.

The acid value of the alkyd resin was 4 and the resin on solution in xylene and addition of driers as in Example 11 gave films which dried in air in less than 2 hours and on stoving gave a hard and tough film. In both cases the films had a slight white haze. The resin was then used to produce a white enamel as described in Example 11 and this produced a film which dried in less than 2 hours to give a hard, glossy coating. The enamel was also stoved to yield a hard, glossy film with good resistance to flexing and impact.

*Example 18*

A mixture of:

| | Per cent |
|---|---|
| Distilled linseed oil fatty acids | 30 |
| Oiticica oil | 10 |
| Xylene | 20 |
| Styrene | 40 | was fed to the reactor. The temperature of the boiling liquid in the bath was 217° C. and that in the reactor was about 220–224° C. The pressure in the reactor was 26–34 atmospheres and the contact time was 60 minutes.

The product from the reactor was freed from unreacted styrene, which amounted to 16% of the styrene originally present, and the xylene by heating to 180° C. under 10 mms. Hg absolute pressure. The residue was cooled and there resulted 77.6 parts of a styrenated product.

This styrenated product was converted to an alkyd resin by reacting with glycerol and phthalic anhydride as described in Example 11. The alkyd resin was diluted with xylene and metal naphthenate driers were added as in Example 11, the viscosity of the resulting solution being 2.2 poises at 25° C. A 3/1000 inch thick film was cast from this solution and exposed to air. The film dried in 1.5 hours to a hard, clear, glossy film; on further standing for several days a clear, tough coating resulted.

*Example 19*

Linseed oil was treated with glycerol in known manner to give linseed oil monoglyceride.

A mixture of:

| | Per cent |
|---|---|
| Linseed oil monoglyceride | 50 |
| Styrene | 50 | was fed to the reactor. The temperature of the boiling liquid in the bath was 253° C. and that in the reactor was about 258–263° C. The pressure in the reactor was 60–70 atmospheres and the contact time was 10 minutes.

The product from the reactor was freed from unreacted styrene, which amounted to 34%, by heating to 180° C. under 15 mms. Hg absolute pressure.

84 parts of this styrenated product were heated with 15 parts of phthalic anhydride as described in Example 11 to give an alkyd resin. This alkyd resin was diluted with xylene and metal naphthenate driers were added as in the preceding example. A ³⁄₁₀₀₀ inch thick film was cast from the resulting solution; the film dried in 1.5 hours to a hard, glossy, slightly opalescent film; on further standing for several days a tough, slightly opalescent coating resulted.

We claim:

1. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C., and being such that from about 30 to 90% by weight of the styrene is reacted.

2. A process for the production of polymeric products from styrene and unsaturated fatty compounds selected from the group consisting of drying oil unsaturated fatty acids, and partial and full esters of polyhydric alcohols and said acids, which comprise continuously passing a reaction mixture of styrene and at least one of said unsaturated fatty compounds, in which the ratio by weight of styrene to fatty compounds is from about 6:4 to 4:6, through a reaction zone initially heated to a temperature of from about 230 to 270° C. and maintained at this temperature by the application of cooling to remove heat developed during the reaction, under a pressure at least sufficient to maintain the reaction mixture in the liquid state, the contact time within the reaction zone varying inversely with the temperature and being from about 5 to about 10 minutes at 270° C. to about 30 to about 60 minutes at 230° C. and being such that from about 30 to 90% by weight of the styrene is reacted.

3. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 250 to 270° C. maintained at this temperature by the application of cooling to remove heat developed during the reaction, under a pressure at least sufficient to maintain the reaction mixture in the liquid state, the contact time within the reaction zone not exceeding 20 minutes and being such that from about 30 to 90% by weight of the styrene is reacted.

4. A process for the production of polymeric products from styrene and drying oil unsaturated fatty acids, which comprises continuously passing a reaction mixture of styrene and the mixed fatty acids derived from at least one drying oil, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

5. A process as claimed in claim 4 in which said reaction mixture contains conjugated drying oil in an amount of up to 50% by weight of its fatty compound content.

6. A process as claimed in claim 4 in which said reaction mixture contains sulphur in an amount of up to 0.5% by weight of its fatty compound content.

7. A process as claimed in claim 4 in which the contact time is such that from 50 to 85% of the styrene is reacted.

8. A process as claimed in claim 4 followed by reacting the polymeric product with a polyhydric alcohol and a polybasic acid to produce an alkyd resin.

9. A process as claimed in claim 4 followed by reacting the polymeric product with a polyhydric alcohol and a polybasic anhydride to produce an alkyd resin.

10. A process for the production of polymeric products from styrene and drying oil unsaturated fatty acids, which comprises continuously passing a reaction mixture of styrene and the mixed fatty acids derived from at least one drying oil, in which the ratio by weight of styrene to fatty compounds is from about 6:4 to 4:6, through a reaction zone initially heated to a temperature of from about 230 to 270° C. and maintained at this temperature by the application of cooling to remove heat developed during the reaction, under a pressure at least sufficient to maintain the reaction mixture in the liquid state, the contact time within the reaction zone varying inversely with the temperature and being from about 5 to about 10 minutes at 270° C. to about 30 to about 60 minutes at 230° C. and being such that from about 30 to 90% by weight of the styrene is reacted.

11. A process for the production of polymeric products from styrene and drying oil unsaturated fatty acids, which comprises continuously passing a reaction mixture of styrene and the mixed fatty acids derived from at least one drying oil, in which the ratio by weight of styrene to fatty compounds is from about 6:4 to 4:6, through a reaction zone initially heated to a temperature of from about 250 to 270° C. and maintained at this temperature by the application of cooling to remove heat developed during the reaction, under a pressure at least sufficient to maintain the reaction mixture in the liquid state, the contact time within the reaction zone not exceeding 20 minutes and being such that from about 30 to 90% by weight of the styrene is reacted.

12. A process for the production of polymeric products from styrene and partial esters of polyhydric alcohols and drying oil unsaturated fatty acids, which comprises continuously passing a reaction mixture of styrene and the partial esters formed by reacting at last one polyhydric alcohol with the mixed fatty acids derived from at least one drying oil, in which mixture the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

13. A process for the production of polymeric products from styrene and drying oils, which comprises continuously passing a reaction mixture of styrene and at least one drying oil, in which the ratio by weight of styrene to drying oil is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

14. A process for the production of polymeric products from styrene and drying oils, which comprises continuously passing a reaction mixture of styrene and mixed drying oils, in which the ratio by weight of styrene to drying oils is from about 6:4 to 4:6 and the mixed drying oils contain up to 50% by weight of conjugated drying oil through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

15. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted, and said reaction mixture containing sulphur in an amount of up to 0.5% by weight of its fatty compound content.

16. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 50 to 85% by weight of the styrene is reacted.

17. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds in a substantially inert solvent, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

18. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through an extended reaction zone of small cross sectional area surrounded by a boiling liquid serving to heat said mixture to a temperature of about 210 to 270° C. and serving to maintain said mixture at this temperature during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted.

19. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure at least sufficient to maintain the reaction mixture in the liquid state, the contact time within the reaction zone varying inversely with the temperature and ranging from about 5 to about 10 minutes at 270° C. to about 60 to about 120 minutes at 210° C. and being such that from about 30 to 90% by weight of the styrene is reacted, and continuously passing products from said reaction zone to a continuous stripping still and stripping unreacted styrene therefrom.

20. A process for the production of polymeric products from styrene and unsaturated fatty compounds selected from the group consisting of drying oil unsaturated fatty acids, and partial and full esters of polyhydric alcohols and said acids, which comprises continuously passing a reaction mixture of styrene and at least one of said unsaturated fatty compounds, in which the ratio by weight of styrene to fatty compounds is from about 6:4 to 4:6, through a reaction zone initially heated to a temperature of from about 210 to 270° C. and maintained at this temperature by the application of cooling to remove heat developed during the reaction, under a pressure of about 25 to 100 atmospheres to maintain the reaction mixture in the liquid state, the contact time within the reaction zone varying inversely with the temperature and ranging from about 5 to about 10 minutes at 270° C. to about 60 to 120 minutes at 210° C. and being such that from about 30 to 90% by weight of the styrene is reacted.

References Cited in the file of this patent

FOREIGN PATENTS

| 622,948 | Great Britain | May 10, 1949 |
| 640,836 | Great Britain | July 26, 1950 |